US011479333B2

(12) United States Patent
Torres Martinez

(10) Patent No.: US 11,479,333 B2
(45) Date of Patent: Oct. 25, 2022

(54) METHOD FOR MANUFACTURING A ONE-PIECE REINFORCED STRUCTURE AND OBTAINED STRUCTURE

(71) Applicant: Manuel Torres Martinez, Pamplona (ES)

(72) Inventor: Manuel Torres Martinez, Pamplona (ES)

(*) Notice: Subject to any disclaimer, the term of this patent is extended or adjusted under 35 U.S.C. 154(b) by 481 days.

(21) Appl. No.: 16/469,357

(22) PCT Filed: Dec. 15, 2017

(86) PCT No.: PCT/ES2017/070820
§ 371 (c)(1),
(2) Date: Jun. 13, 2019

(87) PCT Pub. No.: WO2018/109255
PCT Pub. Date: Jun. 21, 2018

(65) Prior Publication Data
US 2020/0017186 A1 Jan. 16, 2020

(30) Foreign Application Priority Data

Dec. 16, 2016 (ES) .................. P201631603
Jul. 11, 2017 (ES) .................. P201730921

(51) Int. Cl.
B64C 1/06 (2006.01)
B29C 53/80 (2006.01)
(Continued)

(52) U.S. Cl.
CPC ........... *B64C 1/06* (2013.01); *B29C 53/8066* (2013.01); *B29C 70/30* (2013.01); *B29K 2105/243* (2013.01); *B64C 2001/0072* (2013.01)

(58) Field of Classification Search
CPC .......... B64C 1/06; B64C 1/068; B64C 1/061; B64C 1/069
See application file for complete search history.

(56) References Cited

U.S. PATENT DOCUMENTS 3,300,355 A * 1/1967 Adams ................. B29D 99/001
156/196
3,978,256 A * 8/1976 James .................... B64C 1/061
428/66.7
(Continued)

FOREIGN PATENT DOCUMENTS

EP 0444627 9/1991
WO 2006131532 12/2006

OTHER PUBLICATIONS

International Search Report for Corresponding international Application No. PCT/ES2017/070820 ( 8 Pages) (dated Mar. 16, 2018).

Primary Examiner — Michael H Wang
(74) Attorney, Agent, or Firm — Lucas & Mercanti, LLP

(57) ABSTRACT

A method for manufacturing a one-piece reinforced structure and obtained structure is provided, the method using base components made of partially-cured composite material and joining the base components together, applying a coating made of composite material on the base components, and applying heat on the assembly formed by the base components covered with the coating until a complete curing of the assembly is obtained, such that a one-piece reinforced structure made of composite material is obtained formed by the coating and the base components adhered to the coating, wherein the base components that form part of the very manufactured structure act as a mould during the manufacturing process, thus preventing the need to use moulds on which the composite material is deposited that must be subsequently removed from the final obtained structure.

15 Claims, 15 Drawing Sheets

(51) Int. Cl.
*B29C 70/30* (2006.01)
*B29K 105/24* (2006.01)
*B64C 1/00* (2006.01)

(56) References Cited

U.S. PATENT DOCUMENTS

| | | | | |
|---|---|---|---|---|
| 4,086,378 | A * | 4/1978 | Kam | B29C 70/22 |
| | | | | 428/34.5 |
| 4,790,898 | A * | 12/1988 | Woods | B29C 70/32 |
| | | | | 156/166 |
| 5,170,967 | A * | 12/1992 | Hamamoto | B29C 53/805 |
| | | | | 244/119 |
| 5,223,067 | A * | 6/1993 | Hamamoto | B29C 53/805 |
| | | | | 156/169 |
| 7,293,737 | B2 * | 11/2007 | Engwall | B29D 99/0014 |
| | | | | 242/590 |
| 7,459,048 | B2 * | 12/2008 | Pham | B29C 70/446 |
| | | | | 156/169 |
| 8,043,554 | B2 * | 10/2011 | Yip | B29C 70/342 |
| | | | | 264/573 |
| 8,985,512 | B1 * | 3/2015 | Chan | B64C 1/1484 |
| | | | | 244/120 |
| 9,051,062 | B1 | 6/2015 | Boone | B64C 1/069 |
| 9,221,236 | B1 * | 12/2015 | Rotter | B32B 37/00 |
| 2006/0108058 | A1 * | 5/2006 | Chapman | B29C 70/386 |
| | | | | 156/245 |
| 2006/0231682 | A1 * | 10/2006 | Sarh | B64C 1/068 |
| | | | | 244/119 |
| 2007/0011970 | A1 * | 1/2007 | Hethcock | B64C 1/068 |
| | | | | 52/481.1 |
| 2007/0210211 | A1 | 9/2007 | Grob | |
| 2008/0283668 | A1 * | 11/2008 | Martinez Cerezo | B29C 70/446 |
| | | | | 244/133 |
| 2010/0252180 | A1 * | 10/2010 | Rincon | B29C 66/9192 |
| | | | | 156/182 |
| 2011/0052845 | A1 * | 3/2011 | Dermond | B29C 53/66 |
| | | | | 428/34.1 |
| 2011/0303791 | A1 * | 12/2011 | Frauen | B29C 70/202 |
| | | | | 244/120 |
| 2012/0219764 | A1 | 8/2012 | Biornstad et al. | |
| 2013/0020009 | A1 * | 1/2013 | Pham | B64C 1/068 |
| | | | | 156/62.2 |
| 2014/0077471 | A1 * | 3/2014 | Chang | B64C 1/068 |
| | | | | 280/107 |
| 2015/0112413 | A1 | 4/2015 | Eshel et al. | |
| 2015/0274326 | A1 | 10/2015 | Sana et al. | |
| 2016/0001869 | A1 * | 1/2016 | Jorn | B64C 1/064 |
| | | | | 244/119 |
| 2018/0093431 | A1 * | 4/2018 | Forston | B29C 70/345 |

* cited by examiner

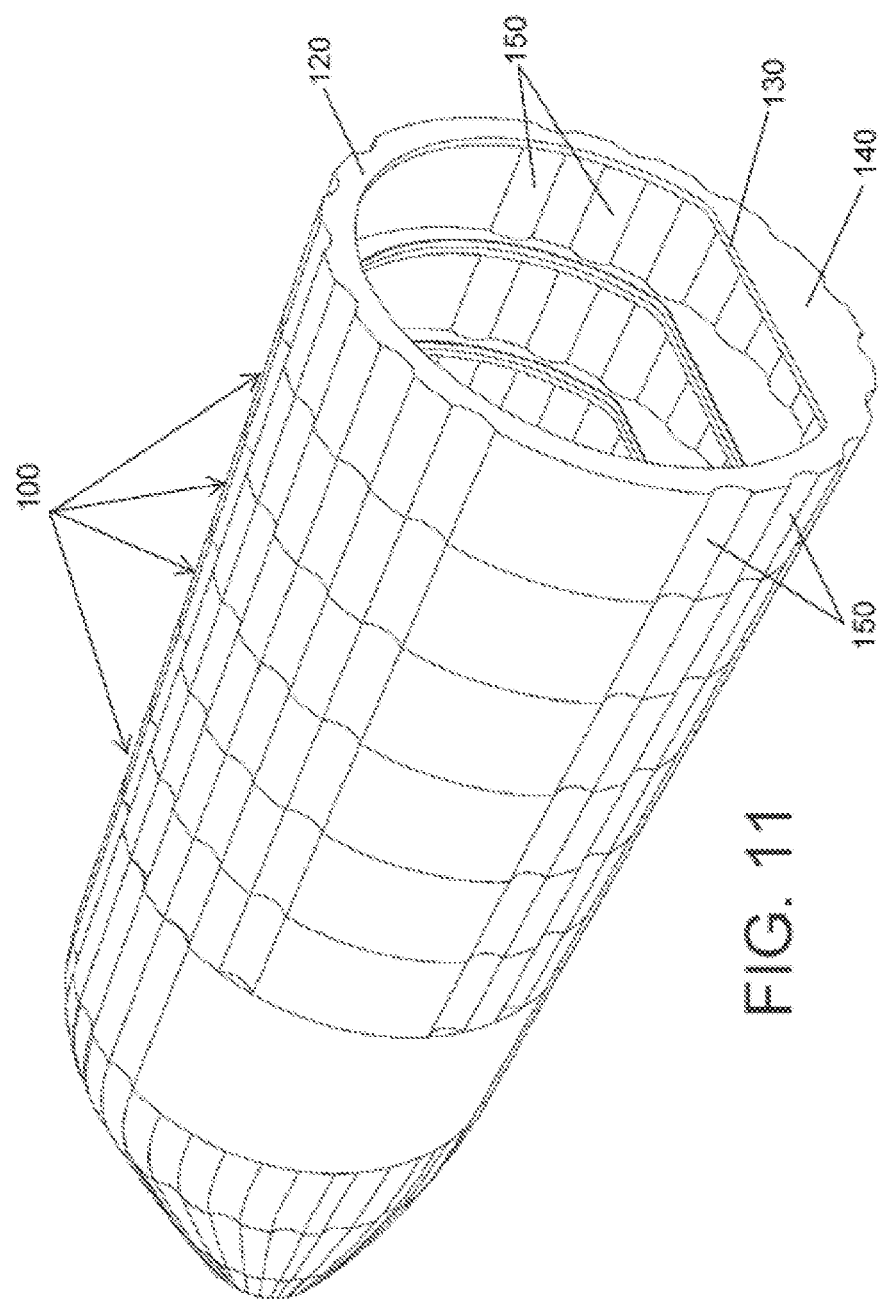

METHOD FOR MANUFACTURING A ONE-PIECE REINFORCED STRUCTURE AND OBTAINED STRUCTURE

CROSS REFERENCE TO RELATED APPLICATION

This Application is a 371 of PCT/ES2017/070820 filed on Dec. 15, 2017 which, in turn, claimed the priority of Spanish Patent Application No. P201631603 filed on Dec. 16, 2016, and Spanish Patent Application No. P201730921 filed on Jul. 11, 2017 each of which are incorporated herein by reference.

TECHNICAL FIELD

The present invention relates to the sector of composite materials, proposing a manufacturing method which enables structures with reinforcements integrated in a single piece to be obtained, according to a one-piece configuration, for application preferably in the manufacturing of aeronautic fuselages.

STATE OF THE ART

The manufacturing of components made of composite material, mainly through glass fibre and carbon fibre, is a technology that is increasingly in demand in sectors such as the aeronautics and automobile sectors, searching for components able to substitute metals that offer equivalent properties and a weight reduction compared to the same.

However, the manufacturing of said components from this type of material is performed in a very manual manner, which implies, in addition to a significant cost, the possibility of errors and mistakes appearing due to the human factor. In the past few years, automatic lay-up technologies, using strips of composite material, have been developed, which enable productivity to be increased and give an increased robustness to the processes.

The manufacturing of components from composite material is heavily based on the use of moulds and precision surfaces in order to be able to situate the composite material in the mould, given that the composite material does not have sufficient stiffness before performing the curing process, for which reason it is necessary to use a mould on which the material is adapted. The moulds must in turn support the work at high temperatures during the curing processes, for which reason the materials used generally have very high costs.

Moreover, in the aeronautics sector the use of composite material is becoming widespread for manufacturing fuselages, due to significant savings in weight that are achieved compared to designs made from metallic material. The common manufacturing of fuselages is performed in separate sections and components, manufacturing the skins, the reinforcing frames, the reinforcing stringers separately and on occasion in multiple components, in order to end with a joining thereof through generally mechanical rivets, many of these being incorporated manually. Due to the high requirements of aeronautic regulations, each rivet must be studied individually in order to certify the safety of the aircraft, for which reason a high number of rivets can entail significant surcharges in the manufacturing process but also in the certification.

Even more so, when the fuselage is made out of composite material, the metallic components of the rivet cannot be manufactured from titanium, a common metal in manufacturing light structures, due to the galvanic corrosion created when both materials touch, which causes the titanium to corrode. This implies the use of rivets made of steel or aluminium, causing a relevant increase in weight of the aircraft, or even individual coatings on every rivet introduced.

Documents are described below which show manufacturing methods for structures made of composite material for the use thereof in fuselages of aircraft, all of these requiring moulds on which the composite material is deposited, which must be subsequently removed.

The patent US2015/0274326 presents a method and the associated system thereof for manufacturing structures from carbon fibre, in this case starting from a series of components prior to being integrated in a single component, through joints between them.

The document US2007/0210211 describes a fuselage and a method for manufacturing it, wherein said structure is manufactured from at least two portions that end up being joined by binders at the ends thereof, obtaining a structure with at least one relatively critical joining area.

The patent US2012/0219764 presents complete fuselage sections manufactured from composite material, constructed by using structural reinforcing components by way of frames and stringers, wherein said reinforcing components, however, are added to the skin through joints.

The patent US2013/0020009 presents a method for manufacturing a fuselage from composite material, wherein, on a mandrel that acts as a mould, both a lay-up of reinforcing components as stringers and a lay-up of the skins of the fuselage are carried out.

The document US2011/0052845 describes a method for manufacturing a hollow body from carbon fibre, in a single piece, preferably intended for manufacturing airplane fuselages. However, said proposal defines a structure that does not incorporate structural reinforcements integrated in the structure and requires an external mould on which the component in the manufacturing process is positioned.

The patent US2015/0122413 presents a method of manufacturing fuselage sections in a single component through a retractable rotating system that enables slots to be arranged for the introduction of stringers and the combined manufacturing of said component, said retractable rotating system acting as a mould of the assembly on which the composite skin material is layered, without introducing frames and without manufacturing a complete fuselage.

The patent US2011/0303791 presents a fuselage section and the production method thereof, from which a component is obtained that does not require complementary stiffening structures since the inside layer creates sufficient stiffness through a correct orientation of the fibres, using a completely layered inside surface and then the placement of reinforcing fibre blocks in different directions, in order to finally use a new outside layer, requiring the use of a mould on which the material that makes up the final component is placed.

Therefore, a solution is necessary that enables one-piece structures to be made of composite material, such as the fuselage of an aircraft, without needing to use moulds or a large number of rivets that increase the manufacturing cost of the structure.

OBJECT OF THE INVENTION

The invention relates to a method for manufacturing a one-piece reinforced structure preferably for application in the aeronautics sector and in the wind energy sector, although it is applicable to structures with similar requirements that could be, by way of non-limiting example, railroad cars, bus chassis, or rockets for launching satellites. The structure directly obtained from said method is also an object of the invention.

The invention enables a structure to be manufactured from composite material without needing to use moulds on which the composite material is deposited that must be subsequently removed from the final piece obtained, as well as enabling the use of rivets to be removed or reduced as much as possible, with the resulting decrease in weight of the finally obtained structure.

The method for manufacturing one-piece reinforced structures of the invention comprises:
- using base components made of partially-cured composite material and joining the base components together,
- applying a coating made of composite material on the base components, and
- applying heat on the assembly formed by the base components covered with the coating until a complete curing of the assembly is obtained, such that a one-piece reinforced structure made of composite material is obtained formed by the coating and the base components adhered to the coating.

The base components, being made of a partially cured composite material, have sufficient stiffness so that the coating made of composite material can be deposited thereon, based on unidirectional continuous fibres, with which the base components act as a mould, but with the advantage that the base components do not need to be removed from the finally obtained structure, unlike what happens with the moulds that are used for manufacturing components from composite material in the state of the art, since the base components of the invention make up part of the finally obtained one-piece reinforced structure. Furthermore, the curing of the base components together with the coating that surrounds them creates a single adhered structure made of composite material that barely requires the use of metal rivets for the structural joining thereof, with the resulting reduction in weight, time and manufacturing costs that this entails.

According to another example of the invention, the base components have slots in the outer contour thereof. According to this, an additional filling is applied, preferably made of a low-density material or a soluble material, in the slots before applying the coating made of composite material.

By using a base component with slots, additional reinforcements are created that also make up part of the one-piece reinforced finally obtained structure, with which there is no need to subsequently add reinforcements to the structure in the axial direction even continuously along the entire length thereof.

According to an example of the invention, base components are used that are manufactured on material in the form of dried fibres that are impregnated with resin through an infusion process and are partially cured by applying heat at a temperature lower than the curing temperature of the resin until a percentage of progress of the curing reaction comprised between 40% and 80% is reached.

According to another example of the invention, base components are used that are manufactured on material in the form of preimpregnated fibres that are partially cured by applying heat at a temperature lower than the curing temperature of the resin until a percentage of progress of the curing reaction comprised between 40% and 80% is reached.

The assembly formed by the base components covered with the coating are completely cured by applying heat at the curing temperature of the resin until a percentage of progress of the curing reaction of 100% is reached.

Additionally, and prior to applying the coating, it is preferable to apply, according to a preferred embodiment, a fill material on the joined base components in a local manner in order to obtain a uniform outer surface of the base components but especially by way of reinforcements for improving the behaviour in areas with concentrated loads and stresses.

When the base components with the slots are used, prior to applying the additional filling in the slots, it is preferable to apply the fill material on the joined base components, applying said fill material in a continuous manner along the slots or even the entire skin.

The fill material thus applied, in addition to improving the uniformity of the structure, acts as an additional coating of the joint of the base components and with the application thereof an additional reinforcement is obtained of the finally obtained structure. Said fill material can be applied by completely or partially covering the base components.

In the configuration with slots, the additional filling of the slots is in turn introduced such that the lay-up of an outer layer can be performed without needing to use the initial fill material, mainly carbon fibre, in the entire geometry of the slot.

Additionally, and prior to applying the additional filling in the slots, it is also preferable to arrange bundles of fibres, or "rovings", at the ends of the slots, which act as extra reinforcement, and once again enable fissures to be prevented in those critical points with concentrated stresses, finally being integrated in the one-piece structure resulting from the manufacturing process.

Optionally, the additional filling can be removed from the slots after having obtained the complete curing of the reinforced one-piece structure, with which the weight thereof is optimised.

The one-piece reinforced structure obtained by means of the method of the invention comprises the base components made of composite material that are joined to each other and covered with the coating made of composite material, wherein the base components have an outer contour with two open ends and each open end has a flange that projects transversely towards the inside of the base component.

Additionally, in order to obtain greater stiffness, each flange has a fold that projects longitudinally towards the inside of the base component according to a plane parallel to the outer contour. Also additionally, each flange has a widened area in the lower portion of the base component.

Additionally, a reinforcing ring is arranged on the folds of each two consecutively joined base components.

According to the process described, the joining of two base components creates a geometry in the joining area thereof equivalent to that of a structural frame, which remains integrated in the created structure.

When the base components with the slots are used, said slots of the axially-joined base components create a geometry equivalent to that of a structural stringer, maintaining the additional filling as a structural portion when using structural foams or even removing it creating a hollow stringer.

Preferably, the slots have an undulating configuration and extend in an axial direction along the entire width of the outer contour of the base component. The slots have a radius of curvature comprised between 50 and 500 mm.

Therefore, the invention results in a one-piece structure manufactured as a single piece, with reinforcing components integrated in the manufacturing which enables it to practically avoid all rivets and additional joining systems between the different components, having a very reduced weight and low manufacturing costs due to the high automation of the process and the reduction in necessary direct labour, in turn reducing the problems deriving from manual work and increasing productivity with respect to the current state of the art.

DESCRIPTION OF THE DRAWINGS

FIG. 11 shows a partial perspective view of an assembly of base components with slots joined together.

DETAILED DESCRIPTION OF THE INVENTION

The invention relates to a one-piece reinforced structure made of a composite material, preferably glass fibre or carbon fibre, that is manufactured without using moulds on which the composite material is deposited that must be subsequently removed from the finally obtained piece, since a portion of the very manufactured structure is used to perform the function of a mould during the manufacturing process.

Figure 9:
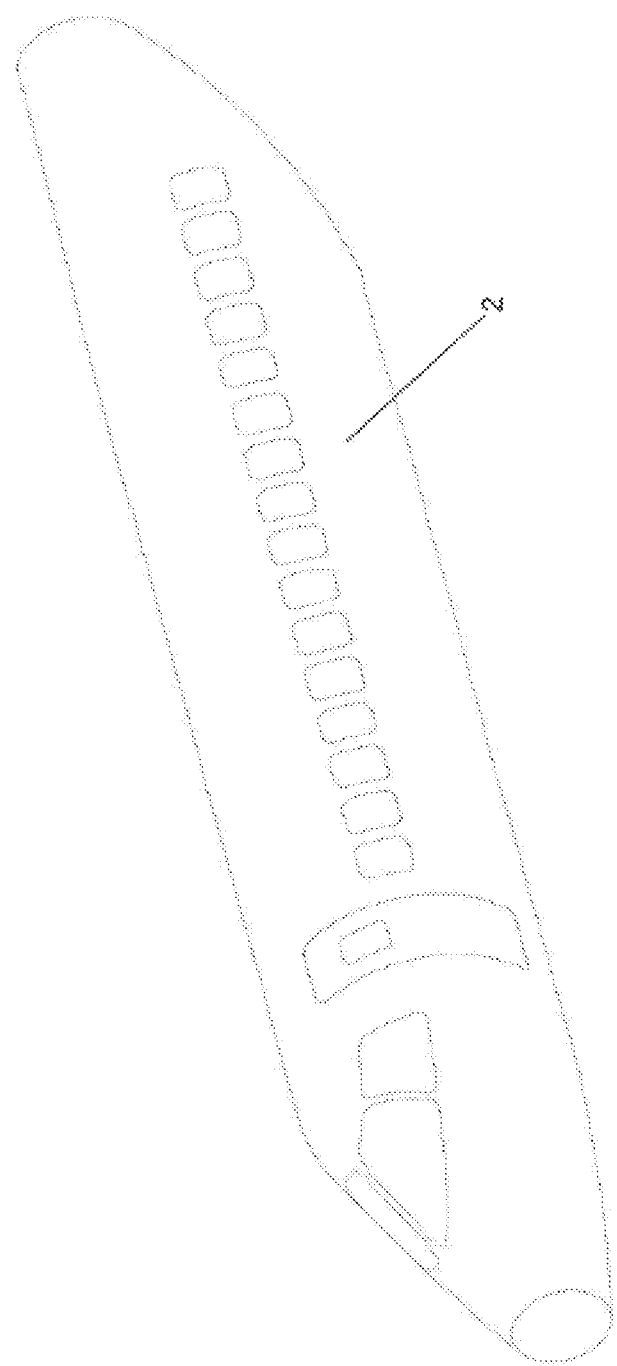
FIG. 9 shows an aeronautic fuselage obtained by means of the method of the invention.
Figure 10:
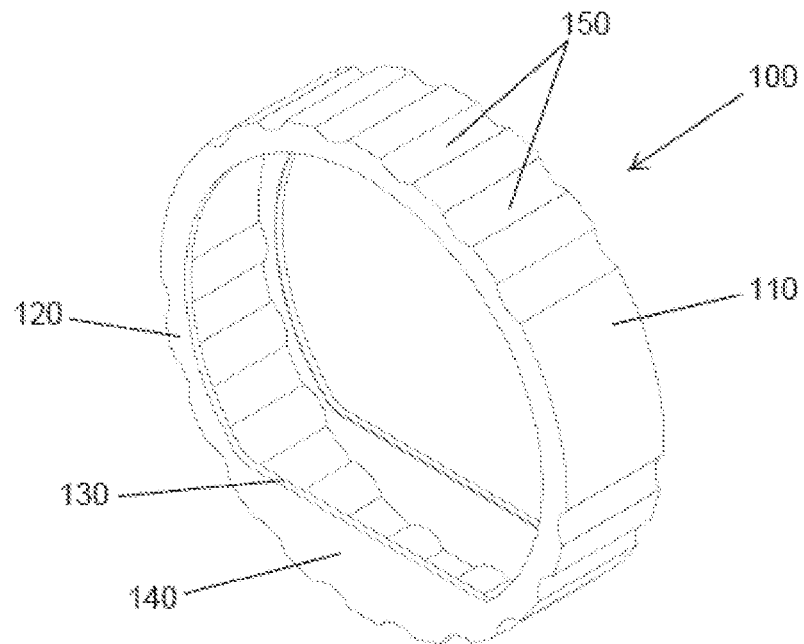
FIG. 10 shows a perspective view of a base component with slots that forms part of the one-piece reinforced structure according to another exemplary embodiment of the invention.
Figure 10B:
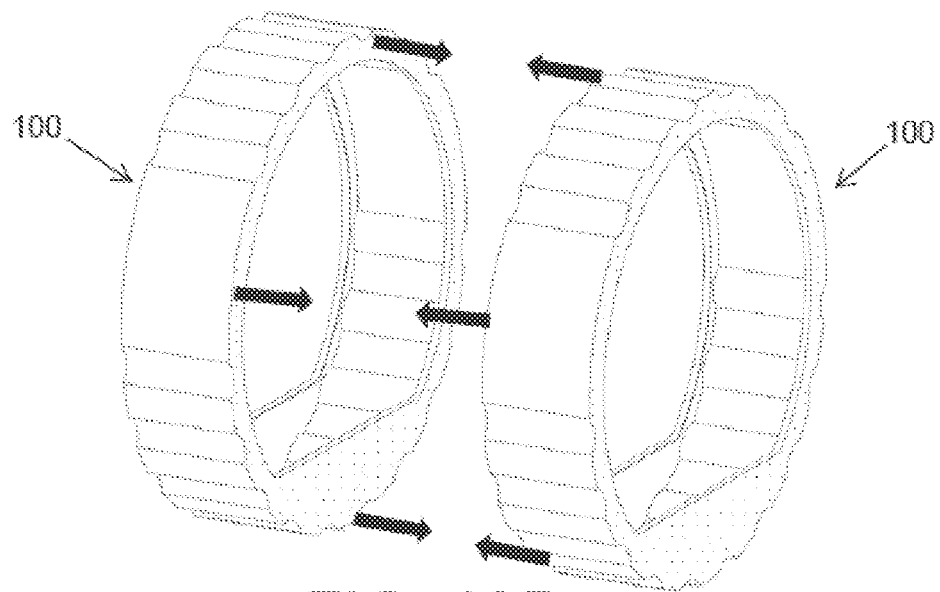
FIG. 10b shows a perspective view of two base components with slots before being joined.
Figure 12:
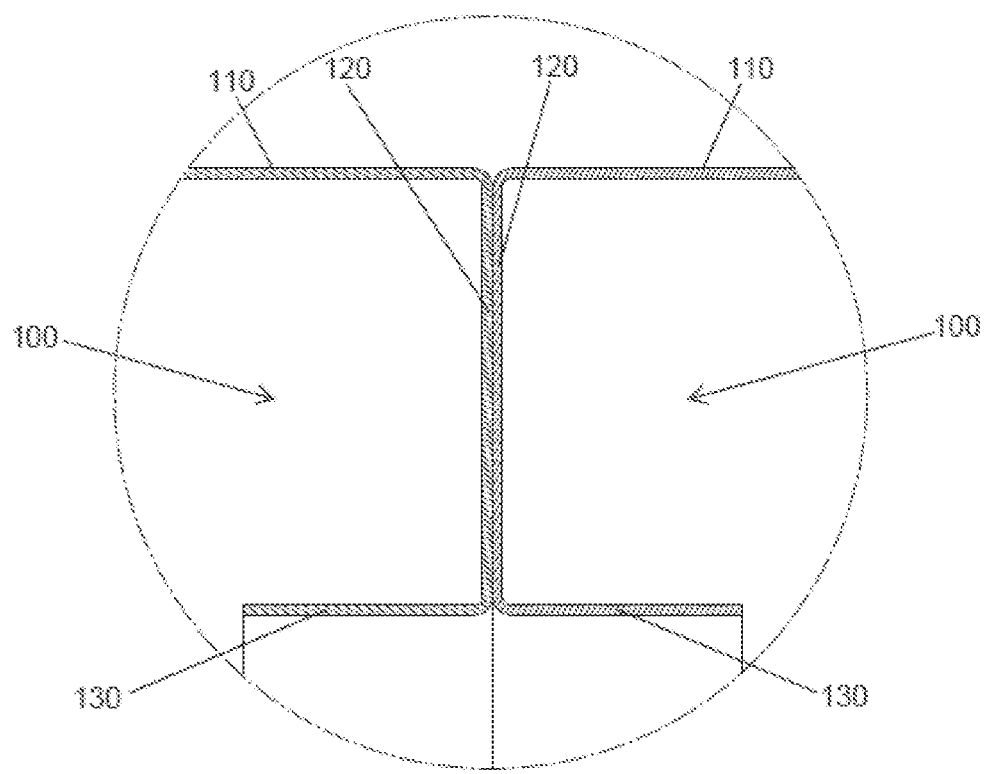
FIG. 12 shows a partial cross-sectional view of two base components with slots joined together.
Figure 13:
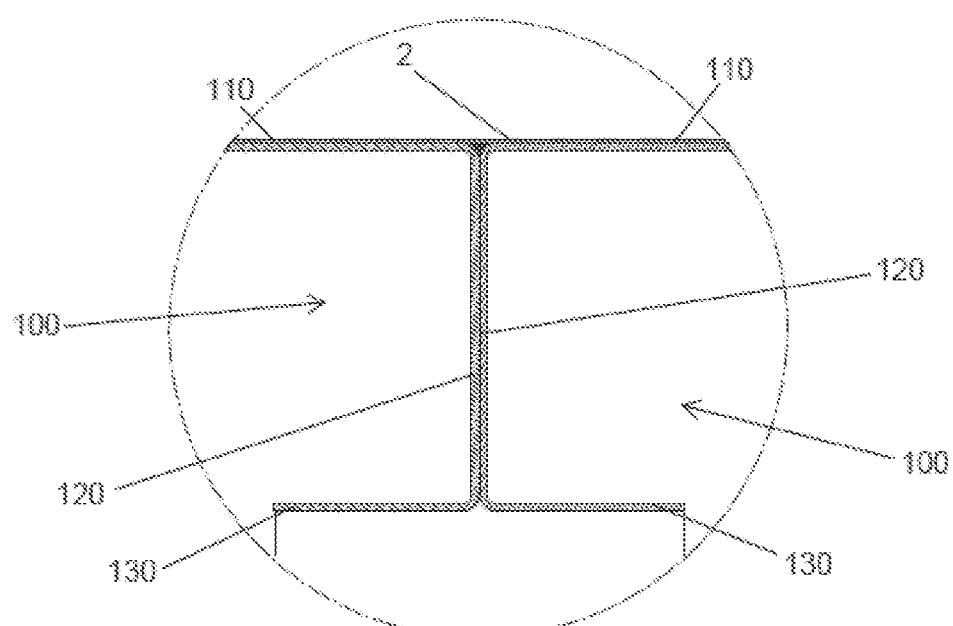
FIG. 13 shows a partial cross-sectional view of the one-piece reinforced structure of the invention.
Figure 14:
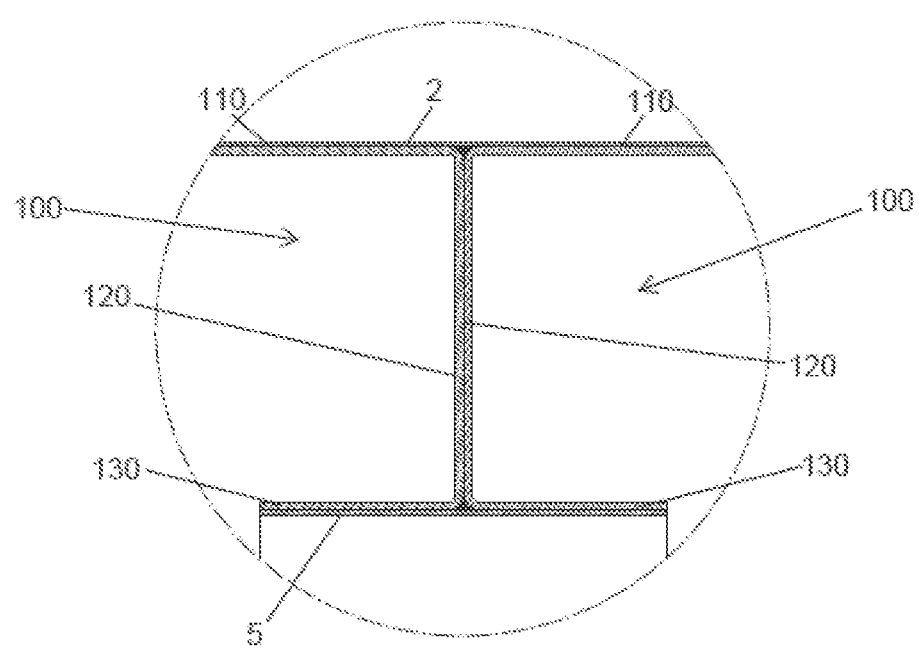
FIG. 14 shows a partial cross-sectional view like that of the previous figure with an inner reinforcing ring.
Figure 15:
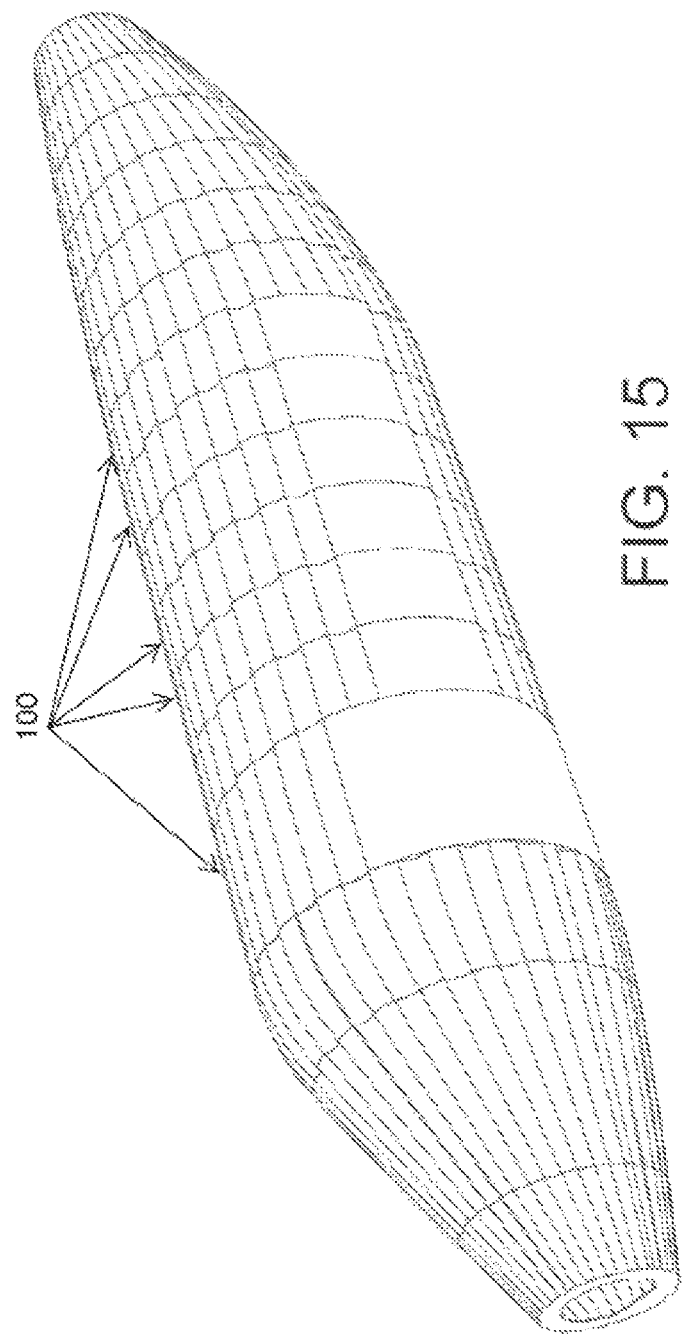
FIG. 15 shows the one-piece reinforced structure made up of base components with slots.
Figure 17:
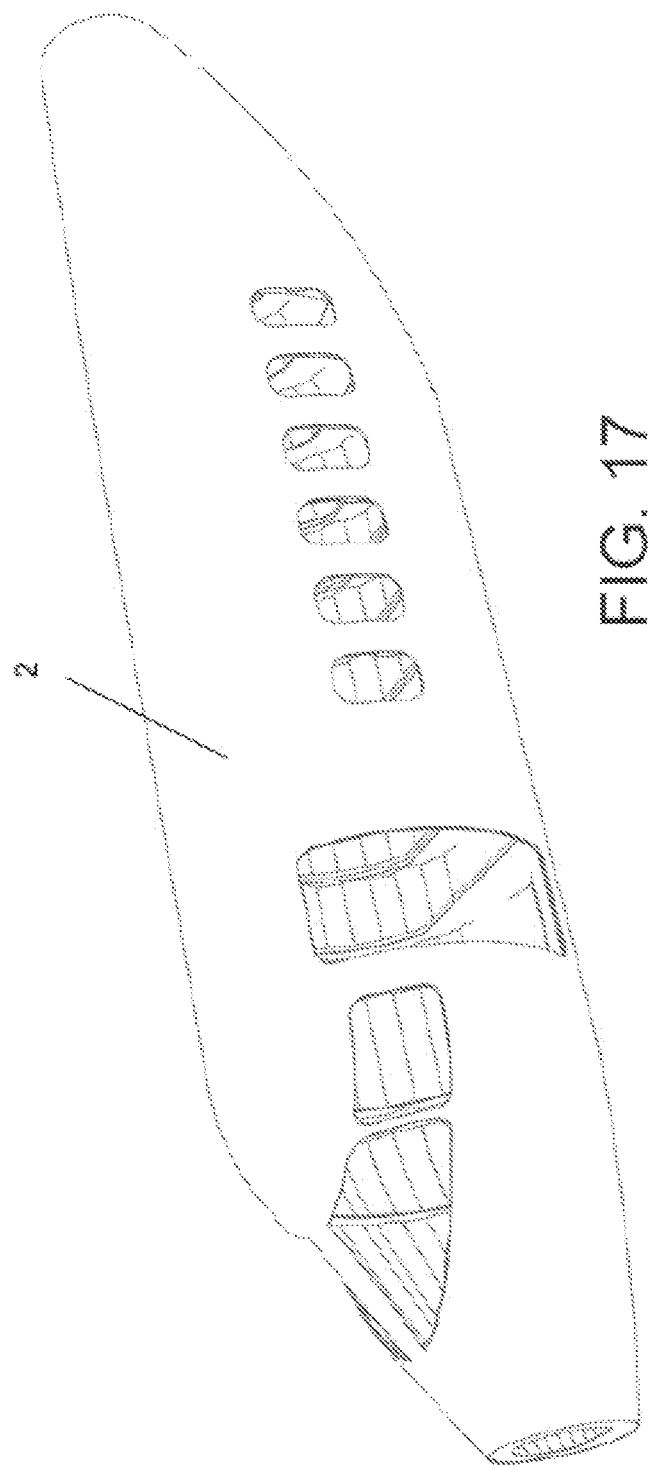
FIG. 17 shows an aeronautic fuselage obtained by means of the method of the invention.

The one-piece reinforced structure made of finally obtained composite material is used for the manufacturing of the fuselage of an airplane, as shown in the example of FIGS. 9 and 17; nevertheless, it can be used to manufacture another type of structure, such as for example one-piece structures for the wind energy, naval or automobile sectors (wind turbine blades, vehicle chassis, the hull of a ship, submarine, etc.).

The figures show a base component (1,100) used in the manufacturing of the structure and which acts as a mould for the deposition of a coating (2) made of composite material, resulting in the base component (1,100) forming an indivisible portion of the finally obtained one-piece reinforced structure by means of the manufacturing process of the invention, with which the method does not require a specific mould to be used or removed after the curing process of the composite material.

FIGS. 1 to 9 show a base component (1) according to an exemplary embodiment of the invention and FIGS. 10 to 19 show another base component (100) according to another exemplary embodiment.

The base component (1,100) comprises an outer contour (11,110) that is configured to receive the coating (2) made of composite material, said outer contour (11,110) defining the geometry of the finally obtained one-piece reinforced structure. The outer contour (11,110) has two open ends in each of which a flange (12,120) is located that projects transversely towards the inside of the base component (1,100), the flange (12,120) being intended to establish a joint with other base components (1,100). Preferably, the outer contour (11,110) of the base component (1,100) has a cylindrical, conical or hollow prismatic geometry, according to the geometry of the one-piece structure to be manufactured.

Additionally, each flange (12,120) has a fold (13,130) that projects longitudinally towards the inside of the base component (1,100) according to a plane parallel to the outer contour (11,110), said fold (13,130) providing additional stiffness to the flange (12,120) of the base component (1,100). Likewise, the flanges (12,120) additionally have a widened area (14,140) in the lower portion of the base component (1,100), which, if the structure is used as the fuselage of an aircraft, would correspond to the area wherein the floor of the aircraft is located.

Preferably, the base components (1,100) are made of glass fibre or carbon fibre, using unidirectional fibre that is applied in the optimal directions defined by the structural design of the base component (1,100). According to an example of the invention, the base components (1,100) are made of dried fibre that subsequently requires the addition of resin for the curing thereof. According to another example of the invention, the base components (1,100) are made of fibre preimpregnated with resin and therefore do not require a subsequent addition of resin.

Therefore, an assembly of base components (1,100) made of a partially cured composite material is used for the manufacturing of the one-piece reinforced structure of the invention. The partial curing enables the composite material of the base components (1,100) to acquire sufficient stiffness for the handling thereof in subsequent phases of the method, such that the very fibres made of composite material acquire sufficient stiffness so as to carry out the function of a mould whereon the coating (2) can be deposited, but it maintains the resin of the composite material applied in a "live" state, capable of creating a joint with a new layer of composite material with a minimal loss of mechanical properties in the interface between layers.

According to an exemplary embodiment of the invention, base components (1,100) made of dried fibre that are impregnated with resin by means of an infusion process and that are heated by applying heat at a temperature lower than the curing temperature of the resin until a percentage of progress of the curing reaction comprised between 40% and 80% is reached in the composite material of the base components (1).

According to another exemplary embodiment of the invention, base components (1,100) are used that are made of preimpregnated fibre that are heated by applying a temperature lower than the curing temperature of the resin until a percentage of progress of the curing reaction comprised between 40% and 80% is reached in the composite material of the base components (1,100).

Subsequently, once the base components (1,100) are partially cured and have acquired sufficient stiffness for the handling thereof they are joined together in order to define a surface whereon the coating (2) must be applied, corresponding to the geometry of the structure to be obtained.

To do so, the base components (1,100) are joined together axially, the flanges (12,120) thereof facing each other. Preferably, the joining is performed by using chemical means; nevertheless, mechanical means or a combination of chemical and mechanical means could be used to establish the joining.

Figure 1:
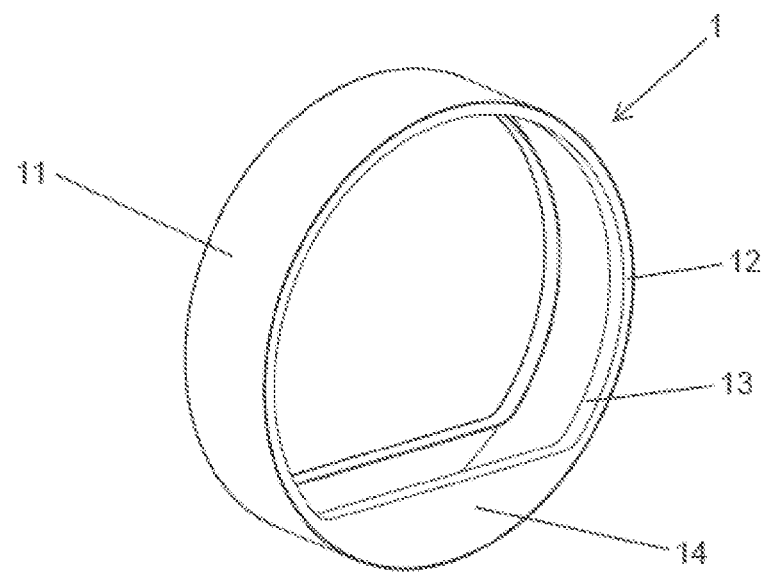
FIG. 1 shows a perspective view of a base component that makes up part of the one-piece reinforced structure of the invention.
Figure 1B:
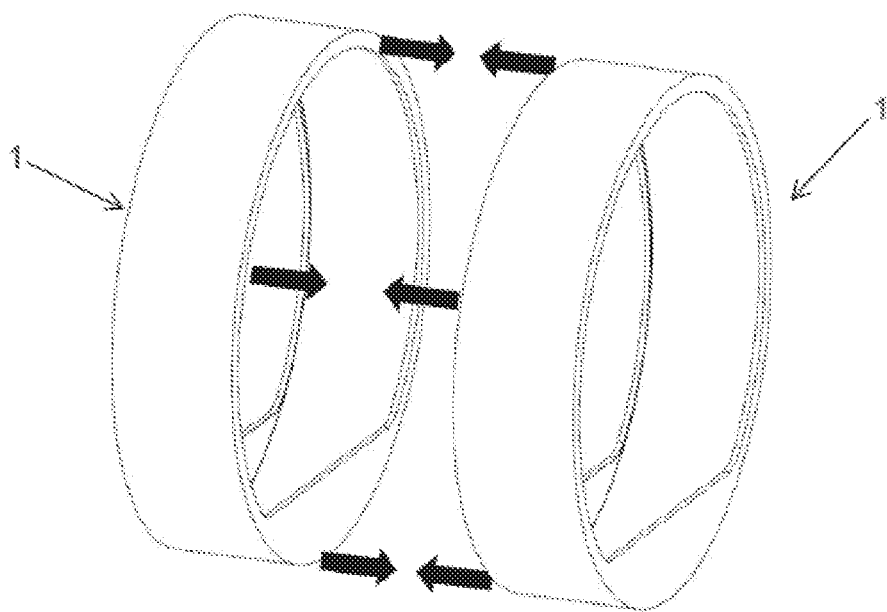
FIG. 1b shows a perspective view of two base components before being joined.
Figure 2:
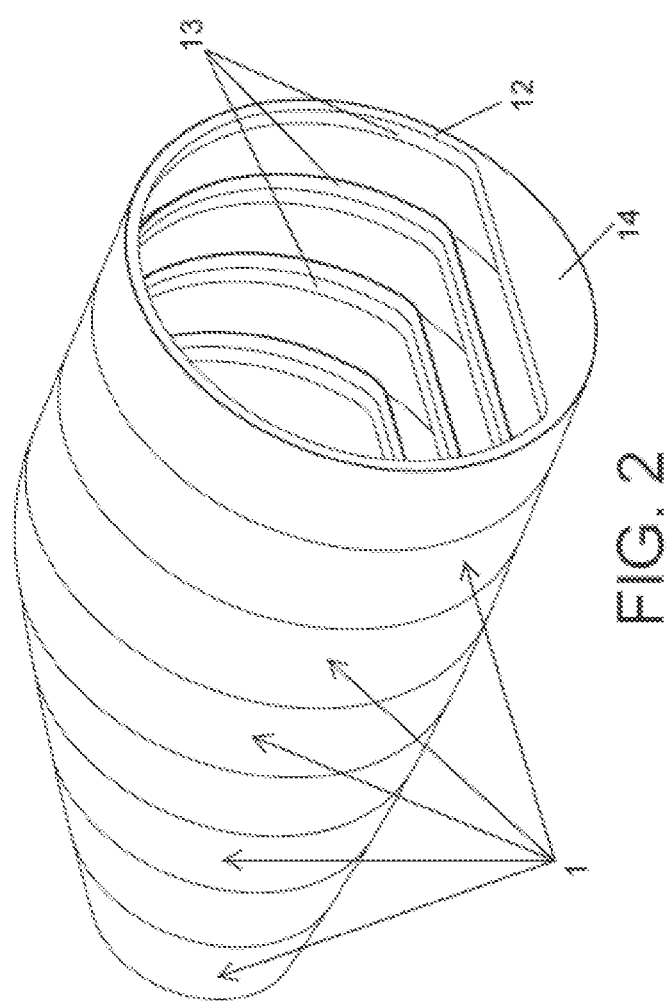
FIG. 2 shows a partial perspective view of an assembly of base components joined together.
Figure 3:
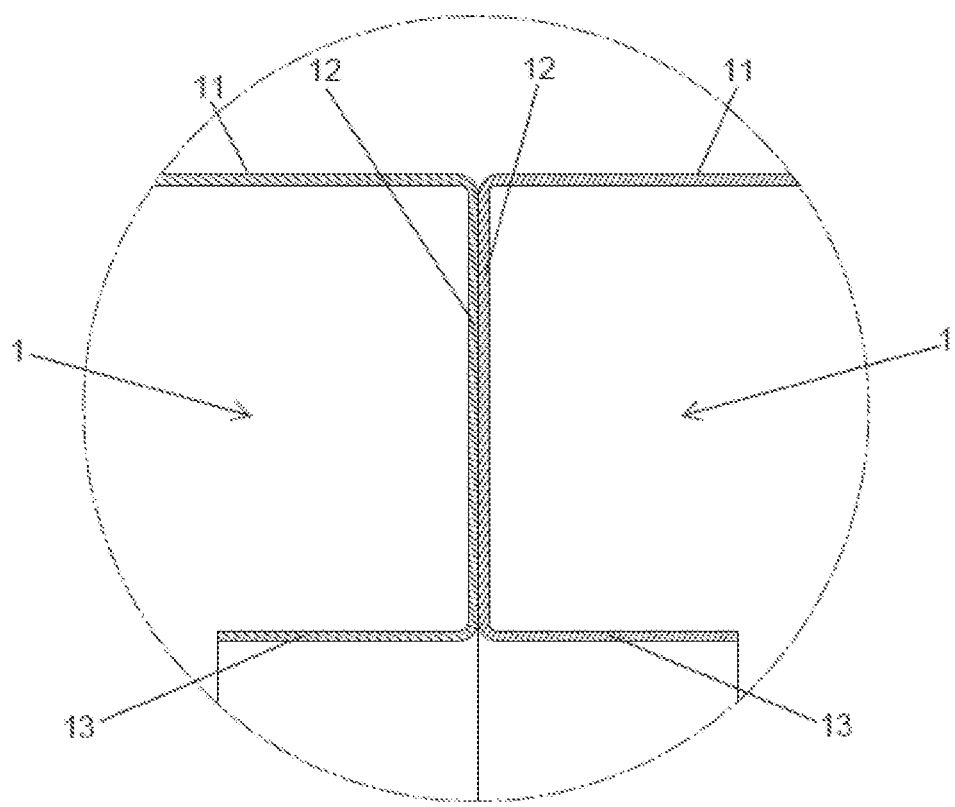
FIG. 3 shows a partial cross-sectional view of two base components joined together.
Figure 4:
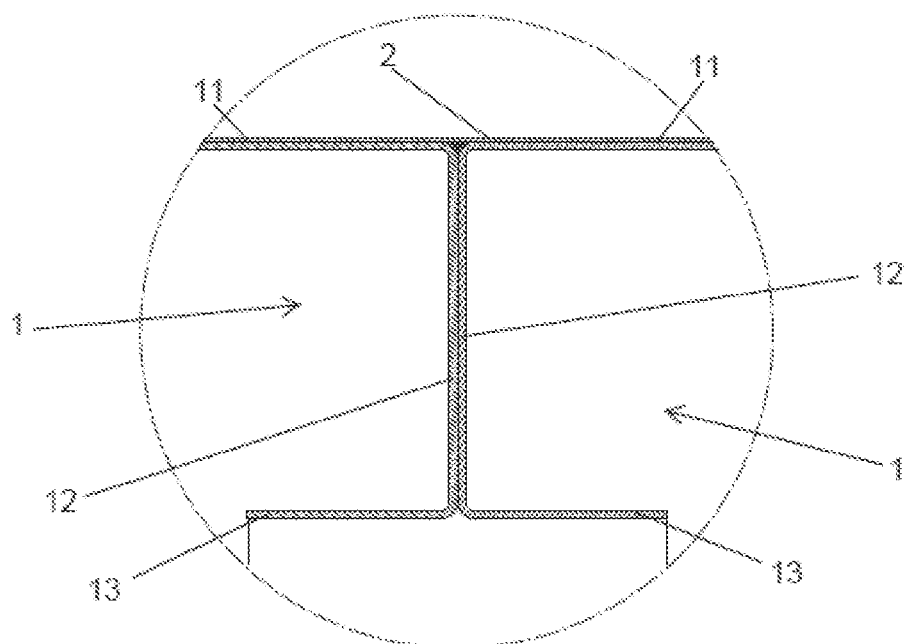
FIG. 4 shows a partial cross-sectional view of the one-piece reinforced structure of the invention.
Figure 5:
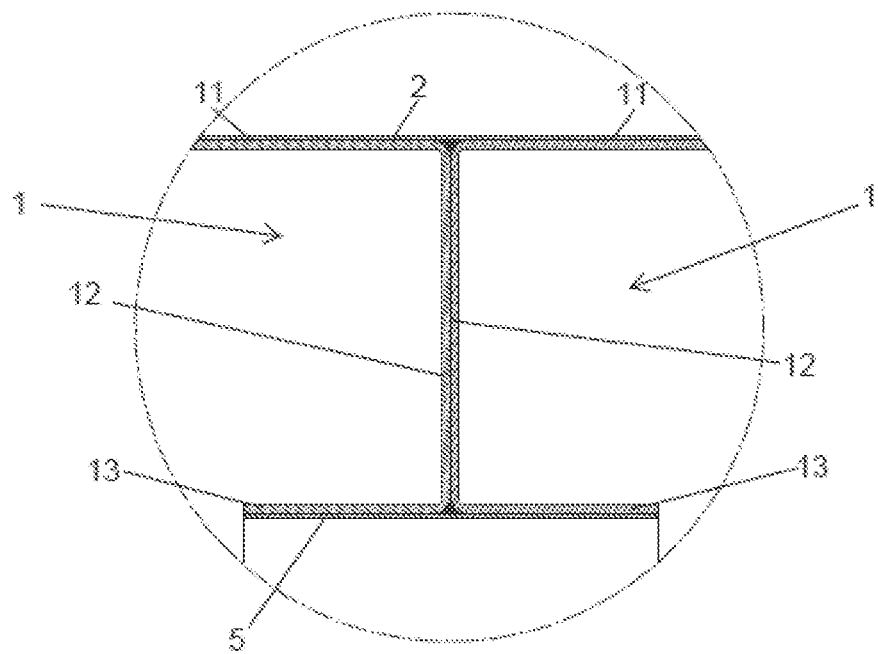
FIG. 5 shows a partial cross-sectional view like that of the previous figure with an inner reinforcing ring.
Figure 6:
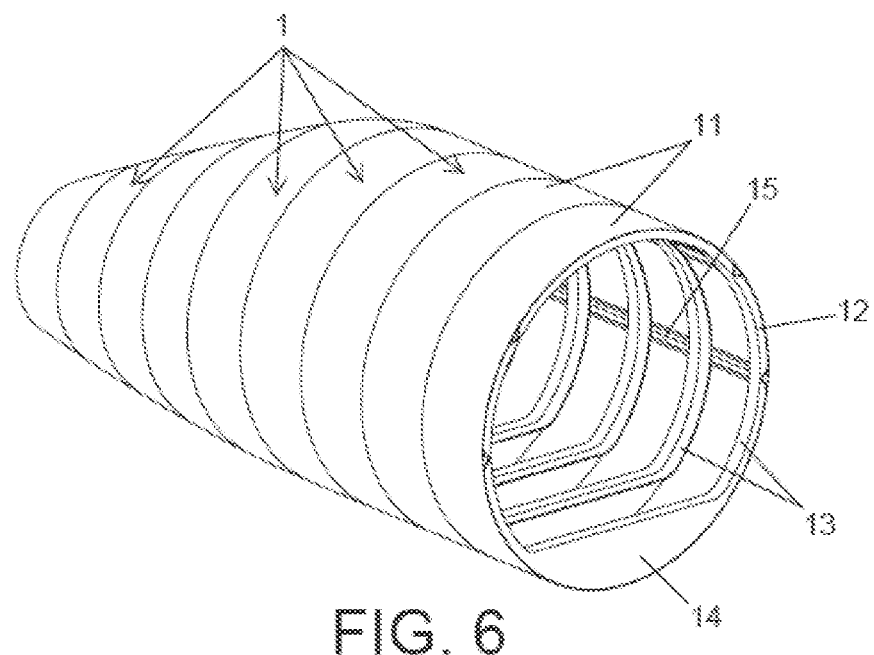
FIG. 6 shows a partial perspective view of an assembly of base components that have reinforcing stringers.
Figure 7:
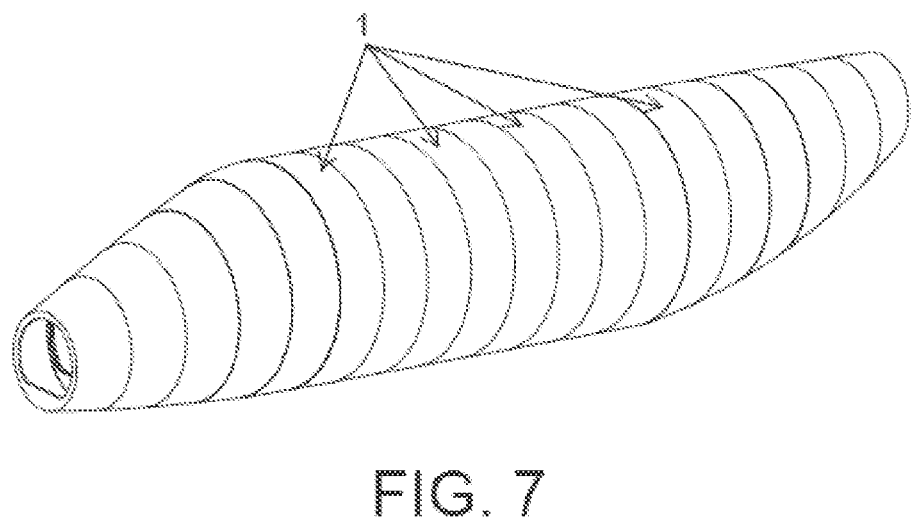
FIG. 7 shows a complete aeronautic fuselage formed by base components.

Additionally, in order to increase the stiffness, the base components (1,100) can have on the inside thereof, in the face opposite the outer contour (11,110), longitudinal sections (15,150) by way of stringers, as shown in FIGS. 6 and 11.

Figure 8:
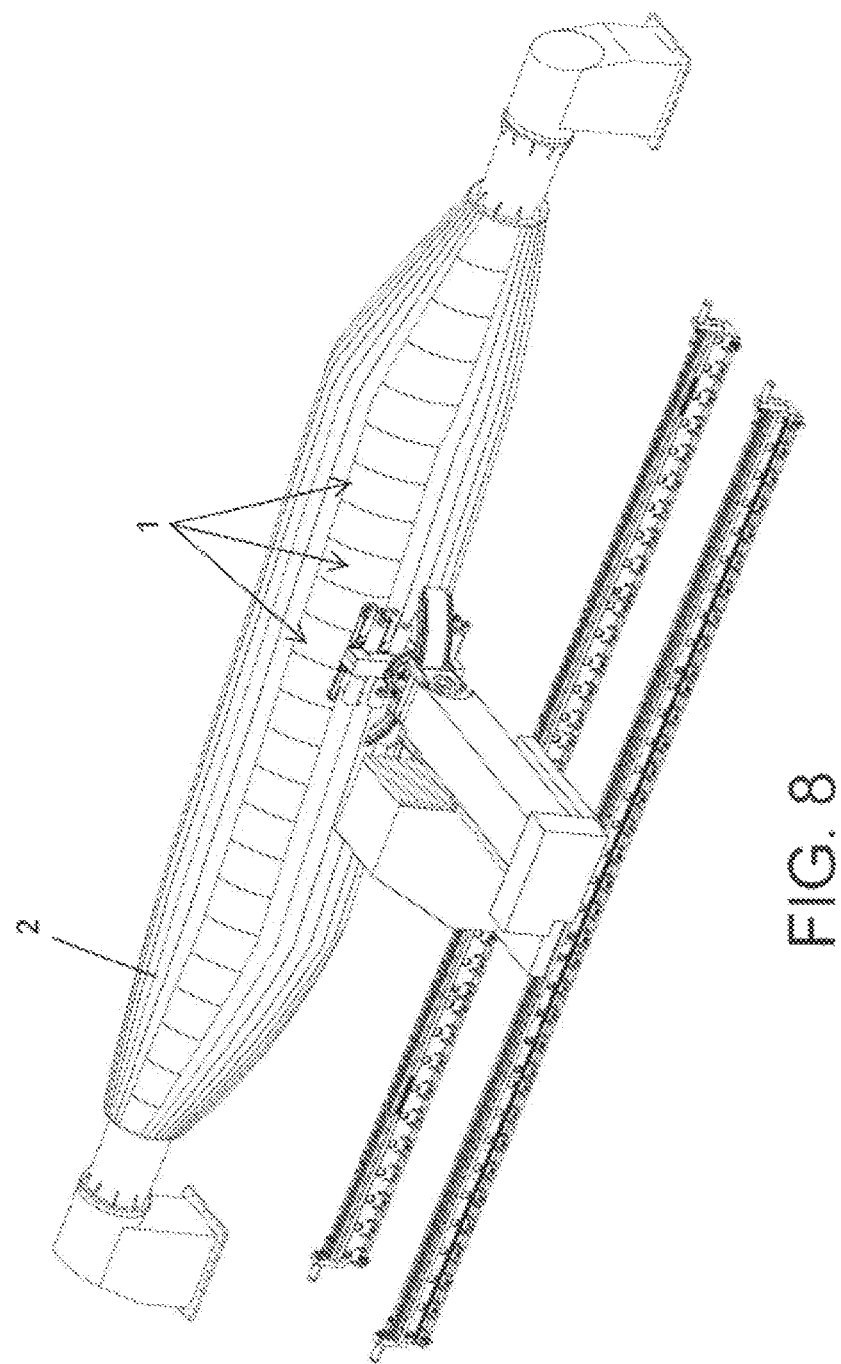
FIG. 8 shows an aeronautic fuselage in a lay-up process.

The assembly of axially-joined base components (1,100) creates the surface whereon the coating (2) made of composite material is applied, such as glass fibre or carbon fibre. Preferably, the coating (2) made of composite material is applied using automatic lay-up techniques. For example, as seen in FIG. 8, a lay-up head is used that applies strips or fibres made of composite material on the outer contour (11,110) of the base components (1,100) according to orientations defined to achieve a layering that meets the final requirements of the structure to be obtained. Alternatively, the coating (2) can be applied by using manual techniques without this altering the concept of the invention.

Additionally, prior to the application of the coating (2), the outer contour (11,110) of the joined base components (1,100) is covered with a fill material that enables a geometry to be obtained that is continuous and without cavities or recesses that hinder the subsequent process of applying the coating (2), or that can worsen the final properties of the finally obtained structure.

This fill material, preferably carbon-fibre based, acts as an additional coating of the joint of the base components (1,100) and, similarly to the coating (2), it has a structural function.

Finally, the axially-joined base components (1,100) covered with the coating (2) are completely cured by applying heat such that the base components (1,100) and the coating (2) remain adhered together forming a single structure, wherein the removal of a mould is not necessary given that the base components (1) that performed said function form part of the structure obtained.

Thus, when the fuselage of an airplane is manufactured, the joining of the coating (2) and the outer contour (11,110) of the base components (1,100) corresponds to the skin of the fuselage, and the joining of the flanges (12,120) of two consecutive base components (1,100) corresponds to the frames of the fuselage. The fuselage created does not require rivets for the joining of different sections of fuselage, since the fuselage is not manufactured in sections but rather in a single piece, wherein the retention of the base components (1,100) is obtained by applying the coating (2) that surrounds them. Rivets are not even required for the joining of frames to the skin, since the base components (1,100) are adhered with the coating (2) in the curing process, all of which results in a fuselage with reduced weight.

According to the process described, the joining of two base components (1,100) creates a geometry in the joining area thereof equivalent to that of a structural frame. The joining of the flanges (12,120) coming from each of the two base components (1,100) to be joined creates the equivalent of a web with a structural profile, while the folds (13,130) of each of the two base components (1,100) create a flange with a structural profile. In the examples of the invention of FIGS. 5 and 14, an additional reinforcement is added to the joint on the inner portion thereof, on the surface created on the inside by the folds (13,130) of the base components (1,100), whereon a reinforcing ring (5) is added which offers greater consistency to the joints between base components (1,100) and reinforces the structural frame created in said joint.

The base component (100) of the exemplary embodiment of the FIGS. 10 to 19 has slots (150) in the outer contour (110) thereof that act as structural reinforcement.

The base component (100) of FIGS. 10 to 19 and the method used for the manufacturing of the one-piece reinforced structures with said base component (100) is identical to the one described previously for the base component (1) of the exemplary embodiment of FIGS. 1 to 9 with the special features indicated below.

The slots (150) define an alternating distribution of valleys and crests in the outer contour (110), which provides the base component (100) with increased strength. The valleys correspond to the slots (150), which project towards the inside of the base component (100), and the crests correspond to the areas established between slots (150), which project towards the outside of the base component (100) with respect to the valleys.

As seen in the figures, the slots (150) preferably have an undulating configuration and extend in the axial direction along all the entire width of the outer contour (110) of the base component (100), that is, the slots (150) extend between the open ends of the outer contour (110), which enables the base component (100) to have an increased strength in the axial direction.

In any case, this undulating configuration and the arrangement of the slots (150) along all the entire width of the outer contour (110) is not limiting, the slots (150) being able to have other shapes or extend in other directions different from the axial one, as well as not occupying the entire width of the outer contour (110), but rather portions of said width.

The slots (150) have a radius of curvature that is selected based on the structural requirements of the structure to be manufactured, a radius of curvature comprised between 50 and 500 mm having preferably been selected.

For the manufacturing of the one-piece reinforced structure, an assembly of base components (100) made of a partially cured composite material are used. When the base components (100) are partially cured and have acquired sufficient stiffness for the handling thereof they are joined together in order to define a surface whereon the coating (2) must be applied, corresponding to the geometry of the structure to be obtained. To do so, the base components (100) are joined together axially, the flanges (120) thereof facing each other.

In this second exemplary embodiment which uses base components (100) with slots (150), before applying the coating (2) on the outer contour (110) of the base components (100), an additional filling (3) is applied in the slots (150) such that it guarantees an outer contour (110) of a surface that is smooth and continuous whereon the coating (2) is applied.

Preferably, the additional filling (3) that is applied in the slots (150) is made of a material that has a lower density than the density of the composite material from which the base component (100) is manufactured, such that the weight of the base component (100) is optimised, which is a critical factor in the applications for which the invention is intended. For example, the additional filling (3) can be a low-density foam or a similar material.

The assembly of axially-joined base components (100) with the additional filling (3) in the slots (150) creates the surface whereon the coating (2) made of composite material, such as glass fibre or carbon fibre, is applied.

Additionally, prior to the application of the additional filling (3) in the slots (150) and of the coating (2), it is preferable to cover the outer contour (110) of the already joined base components (100) with the filling material (4), preferably a series of sheets in unidirectional carbon fibre, which enables a geometry to be guaranteed that is continuous and without cavities or recesses that hinder the subsequent process of applying the additional filling (3) and of applying the coating (2), or that can worsen the final properties of the finally obtained structure.

The preferably applied fill material (4) acts as a structural reinforcement for the joining of the base components (100). This fill material (4) is applied on the entire outer contour (110) of the base components (100), thereby covering the crests and the valleys, such that a continuity is obtained in the obtained structure.

Alternatively the fill material (4) can be applied partially, covering the outer contour (110) of the base components (100), thereby for example only being applied on the crests, or only on the valleys.

Finally, the axially-joined base components (100) covered with the coating (2) are completely cured by applying heat such that the base components (100) and the coating (2) remain adhered together forming a single structure.

Optionally, after the curing the additional filling (3) is removed from the slots (150), with which the weight of the one-piece structure obtained is optimised. To do so, the additional filling (3) can be made of a soluble material, such that the removal thereof is obtained by making a solvent circulate through the slots (150).

The removal of the additional filling (3), or the maintenance thereof in the slots (150), depends on the weight requirements of the structure to be obtained and on the local warping behaviour thereof, as well as for example, the additional filling (3) can be maintained when a low-density foam or a similar material is used, since it does not compromise the weight of the structure.

The coating (2) applied on the joined base components (100) also acts as structural reinforcement. Said coating (2) is applied on the outer contour (110) of the base components (100) coming into contact with the additional filling (3) of the slots (150) and with the areas of the outer contour (110) established between slots (150), that is, the crests of the outer contour (110). Thus, the cohesion of the base components (100) and the coating (2) is established by the crests.

In the preferred case of applying the fill material (4), the cohesion of the base components (100) and the coating (2) is also established by the areas wherein the crests stay covered by the fill material (4).

The slots (150) of several base components (100) that are joined together axially perform the function of reinforcing stringers of the fuselage, such that it is not necessary to add said reinforcing stringers to the finally obtained structure in a subsequent process, with the resulting saving in time that this provides, apart from not requiring rivets to join the stringers to the structure, since the base components (100) carry the stringers intrinsically defined therein.

According to the process described, the joining of two base components (100) creates a geometry in the joining area thereof equivalent to that of a structural frame. The joining of the flanges (120) coming from each of the two base components (100) to be joined creates the equivalent of a web with a structural profile, the joining of the slots (150) creates the equivalent of a structural stringer, while the folds (130) of each of the two base components (100) create a flange with a structural profile.

According to a preferred exemplary embodiment of the invention, before applying the additional filling (3) in the slots (150) of the joined base components (100) or applying the coating (2), bundles of fibres (6), commonly called "rovings", are arranged at the ends of the slots (150). Specifically, a bundle of fibres (6) is arranged in each transition between a valley and a crest of the outer contour (110) of a base component (100).

The bundles of fibre (6) or "rovings" act as an additional reinforcement and prevent fissures in the transition between valleys and crests that are critical points of stress concentrations, finally being integrated in the one-piece structure resulting from the manufacturing process. It has been envisaged that the bundles of fibre (6) or "rovings" are carbon fibre with the fibres oriented in certain directions.

Figure 16:
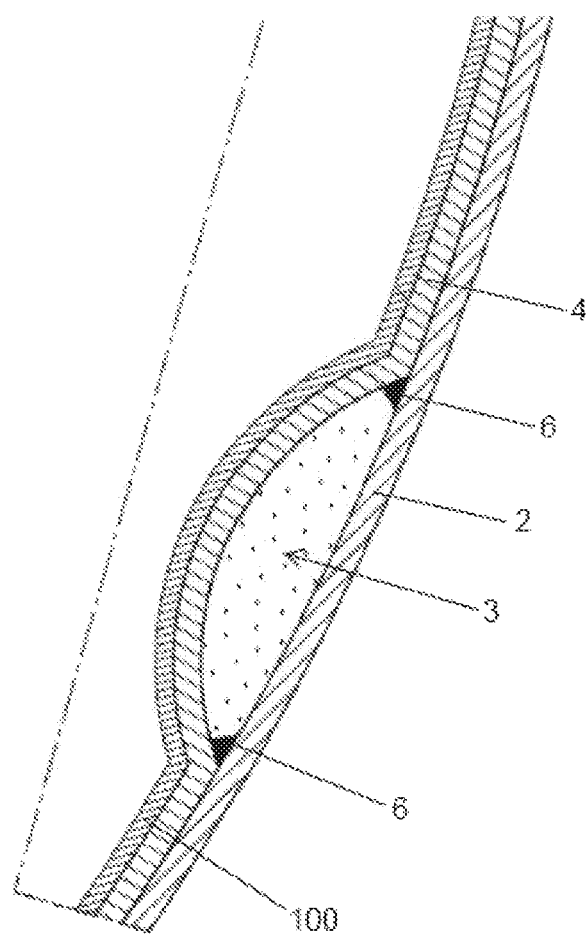
FIG. 16 shows a cross-sectional view of the layers that form the one-piece reinforced structure according to a preferred exemplary embodiment of the invention.

FIG. 16 shows a cross-sectional view of a non-limiting preferred embodiment of the one-piece reinforced structure obtained according to the method of the invention. Said cross section shows a base component (100), the outer contour (110) thereof having the fill material (4) deposited thereon, subsequently having applied the bundles of fibre (6) and the additional filling (3) in the slots (150), and the coating (2) subsequently being applied.

Figure 18:
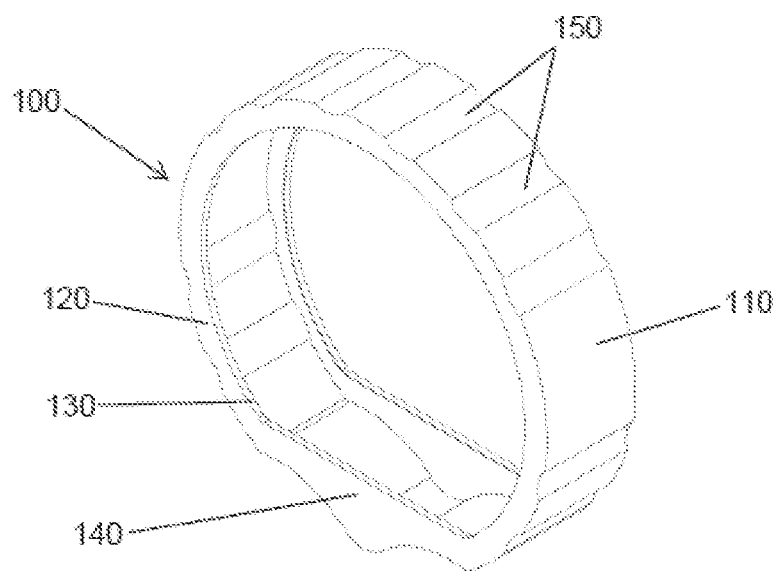
FIG. 18 shows a perspective view of a base component with slots that form part of the one-piece reinforced structure of the invention for an amphibious version of the fuselage.
Figure 19:
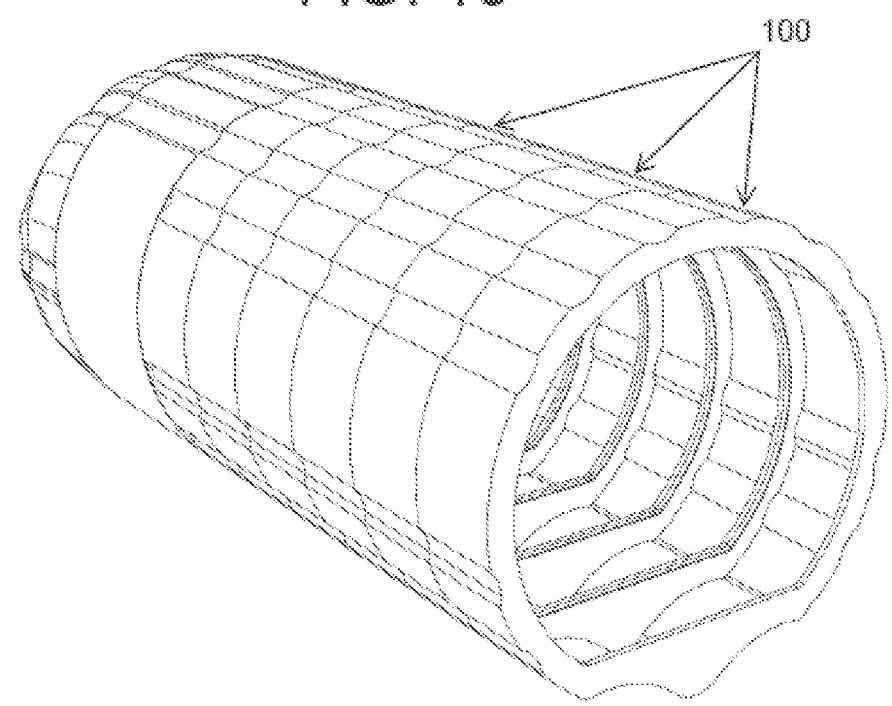
FIG. 19 shows the one-piece reinforced structure formed of base components with slots for the amphibious version of the fuselage.

FIG. 18 shows a base component (100) that makes up part of a one-piece reinforced structure for an amphibious version of a fuselage, while FIG. 19 shows the amphibious version of the fuselage.

The invention claimed is:

1. A method for manufacturing a one-piece reinforced structure, comprising:
    using a plurality of base components made of partially-cured composite material, wherein each base component of the plurality of components has an outer contour and a flange, wherein the base components are joined together abutting the flanges of the base components such that the outer contour of the plurality of base components form a continuous outer surface,
    applying a coating made of composite material on the continuous outer surface of the plurality of base components, and
    applying heat on the plurality of base components covered with the coating until a complete curing of an assembly is obtained, such that a one-piece reinforced structure made of the plurality of composite material is obtained formed by the coating and the base components adhered to the coating, wherein the base components form an indivisible part of the one-piece reinforced structure obtained by the method.

2. The method for manufacturing a one-piece reinforced structure according to claim 1, wherein the base components have slots in the outer contour and wherein an additional filling is applied in the slots before applying the coating made of composite material.

3. The method for manufacturing a one-piece reinforced structure according to claim 2, wherein before applying the additional filling in the slots, bundles of fibers are arranged at ends of the slots.

4. The method for manufacturing a one-piece reinforced structure according to claim 2, wherein the additional filling is removed from the slots after having obtained complete curing.

5. The one-piece reinforced structure according to claim 2, wherein the slots have an undulating configuration and extend in an axial direction along an entire width of the outer contour of the base component.

6. The one-piece reinforced structure according to claim 2, wherein the slots of the base components have a radius of curvature comprised between 50 and 500 mm.

7. The method for manufacturing a one-piece reinforced structure according to claim 1, wherein the base components are in the form of dried fibers that are impregnated with resin through an infusion process or in the form of preimpregnated fibers and that are partially cured by applying heat at a temperature lower than the curing temperature of the resin until a percentage of progress of the curing reaction comprised between 40% and 80% is reached.

8. The method for manufacturing a one-piece reinforced structure according to claim 1, wherein the assembly formed by the base components covered with the coating are completely cured by applying heat.

9. The method for manufacturing a one-piece reinforced structure according to claim 1, wherein the coating made of composite material is applied using automatic lay-up techniques.

10. The method for manufacturing a one-piece reinforced structure according to claim 1, wherein prior to applying the coating, a fill material is applied on the joined base components in order to obtain a uniform outer surface of the base components.

11. The method for manufacturing a one-piece reinforced structure according to claim 10, wherein the fill material is applied on the joined base components before applying the additional fill in the slots.

12. A one-piece reinforced structure obtained by the method of claim 1, further comprising base components made of the composite material that are joined to each other and covered with the coating made of composite material, wherein the base components have the outer contour with two open ends and each open end has the flange that projects transversely towards inside cavity of the base component.

13. The one-piece reinforced structure according to claim 12, wherein each flange has a fold that projects longitudinally towards the inside cavity of the base component according to a plane parallel to the outer contour.

14. The one-piece reinforced structure according to claim 12, wherein each flange has a widened area in a lower portion of the base component.

15. The one-piece reinforced structure according to claim 1 wherein bundles of fibers are arranged at ends of the slots.

* * * * *